(12) United States Patent
Huang (10) Patent No.: US 9,447,567 B2
(45) Date of Patent: Sep. 20, 2016

(54) FLOW ADJUSTABLE BUBBLE AERATOR (71) Applicant: So-Mei Huang, Tai Ping (TW)

(72) Inventor: So-Mei Huang, Tai Ping (TW)

( * ) Notice: Subject to any disclaimer, the term of this patent is extended or adjusted under 35 U.S.C. 154(b) by 284 days.

(21) Appl. No.: 14/201,813

(22) Filed: Mar. 8, 2014

(65) Prior Publication Data
US 2015/0252555 A1 Sep. 10, 2015

(51) Int. Cl.
E03C 1/08 (2006.01)
E03C 1/084 (2006.01)

(52) U.S. Cl.
CPC .................................. *E03C 1/084* (2013.01)

(58) Field of Classification Search
USPC ....................................................... 239/428.5
See application file for complete search history.

(56) References Cited

U.S. PATENT DOCUMENTS

| | | | | | |
|---|---|---|---|---|---|
| 2,935,265 | A | * | 5/1960 | Richter | E03C 1/084 239/107 |
| 3,014,665 | A | * | 12/1961 | Shames | E03C 1/084 239/107 |
| 3,768,735 | A | * | 10/1973 | Ward | E03C 1/084 239/428.5 |
| 7,472,846 | B2 | * | 1/2009 | Thomas | E03C 1/084 239/391 |
| 9,139,988 | B2 | * | 9/2015 | Lin | E03C 1/084 |
| 2007/0108314 | A1 | * | 5/2007 | Cutler | E03C 1/0404 239/428.5 |
| 2012/0048968 | A1 | * | 3/2012 | Williams | E03C 1/0409 239/443 |

* cited by examiner

*Primary Examiner* — Arthur O Hall
*Assistant Examiner* — Adam J Rogers
(74) *Attorney, Agent, or Firm* — Guice Patents PLLC (57) ABSTRACT

A flow adjustable bubble aerator is formed by a water tank, an outer casing, a rear tank, an adjustment assembly, a rear seat, a ball-shaped connector and a joint seat. The adjustment assembly includes an upper fixing plate, a lower plate base and an adjustment bolt. A bottom of the adjustment bolt is provided with a tool operation part, such that a tool can be used to adjust the discharge capacity outside the bubble aerator, thereby complying with the requirements of water saving and water usage.

13 Claims, 11 Drawing Sheets

FLOW ADJUSTABLE BUBBLE AERATOR

BACKGROUND OF THE INVENTION a) Field of the Invention

The present invention relates to a flow adjustable bubble aerator, and more particularly to a bubble aerator of which the discharge capacity can be adjusted on demand, allowing a user to adjust the discharge capacity outside the bubble aerator, thereby complying with the requirements of water saving and water usage.

b) Description of the Prior Art

Figure 1:
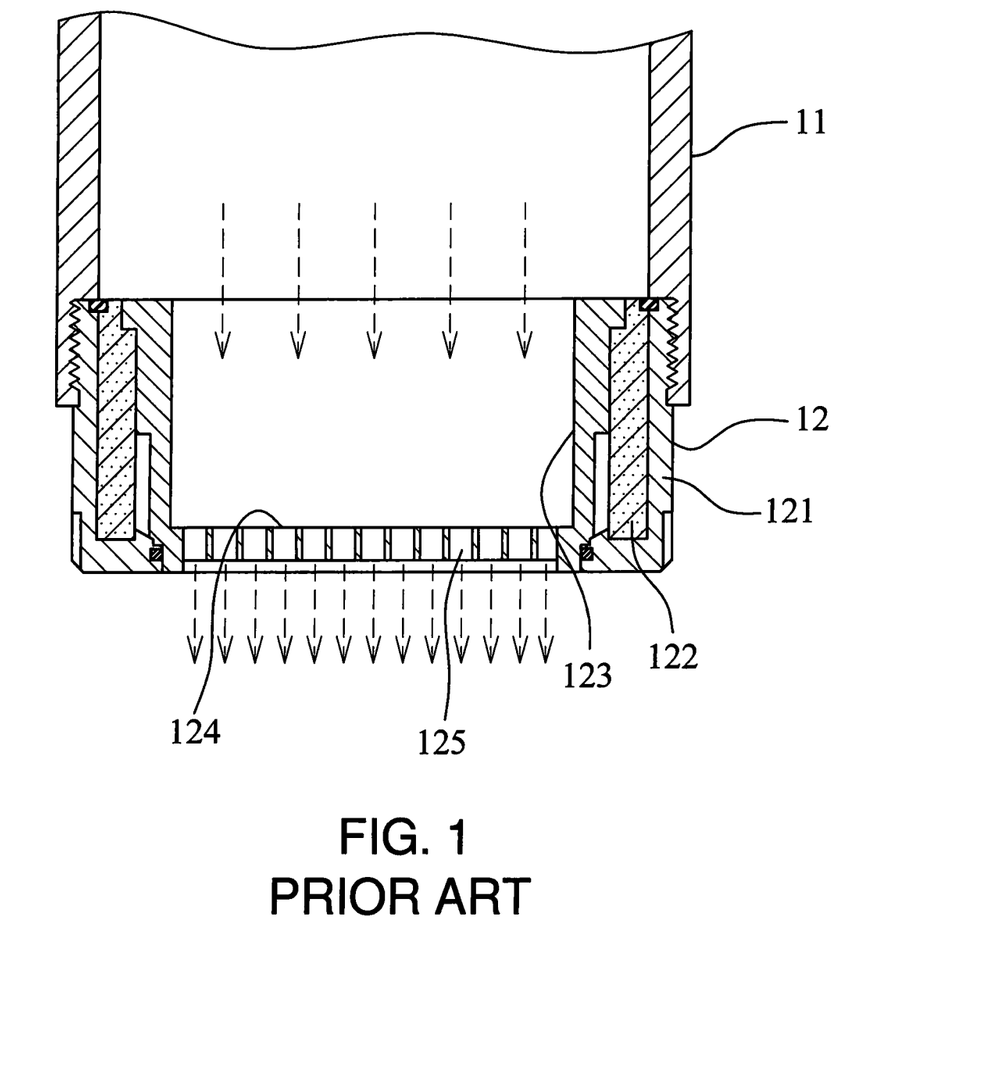
FIG. 1 shows a schematic view of use of a conventional bubble aerator.

Referring to FIG. 1, an existing bubble aerator 12 has been used for years. The bubble aerator 12 is installed at an outlet of a faucet 11 to prevent water from being flushed out too intensively, thereby causing water splash. Through the buffering effect of the bubble aerator 12, water can flow more uniformly and smoothly. There are many kinds of this bubble aerator 12 and most of them are constituted by an outer casing 121, an inner casing 123 and a filling 122 which is disposed between the outer casing 121 and the inner casing 123. In addition, an outlet surface 124 of the inner casing 123 is provided with plural drain holes 125 through which water can flow out uniformly. Although this kind of structure can achieve the purpose of preventing from water splash, it is not necessary to satisfy the requirements of water saving and water usage. According to the requirement of the discharge capacity of a faucet in the US national standards, the discharge capacity has to keep at 1.0~2.2 GPM in order to comply with the standard of water usage of energy saving. However, the discharge capacity is not exactly the same for every faucet, especially due to that the water pressure at the site of use can be varied from site to site and is difficult to be consistent. For most of the existing bubble aerator, the discharge capacity is at a fixed flow rate and therefore is very hard to be adjusted correspondingly in accordance with the condition of use.

SUMMARY OF THE INVENTION

Accordingly, a primary object of the present invention is to provide a flow adjustable bubble aerator of which the discharge capacity can be adjusted on demand, such that a user can adjust the discharge capacity outside the bubble aerator, thereby complying with the requirements of water saving and water usage.

To achieve the aforementioned object, the flow adjustable bubble aerator, according to the present invention, includes:

a water tank, the water tank includes a cylinder unit, a water tray and a retaining sleeve, with that the cylinder unit is formed by connecting an outer barrel with an inner barrel, a first chamber is disposed between the outer barrel and the inner barrel, a bottom of the first chamber where the outer barrel is connected with the inner barrel is provided with plural first drain holes, a center of the inner barrel is provided with a first round hole, a front side of the inner barrel is provided with a second chamber, the second chamber is connected with the first round hole, and the water tray is sheathed and fixed at a front side of the second chamber by the retaining sleeve;

an outer casing, the outer casing is a hollow shell and the cylinder unit is sheathed in the outer casing;

a rear tank, an upper rim of the rear tank is provided with a limiting flange, and a center of the rear tank is provided with a second round hole, with that the second round hole is provided with a first inner threaded section;

an adjustment assembly, the adjustment assembly includes an upper fixing plate, a lower plate base and an adjustment bolt, with that a center of the upper fixing plate is provided with a second through-hole, a top of the lower plate base is provided with a round disk, the round disk is attached with the upper fixing plate, a center of the round disk is provided downward with an inner screw hole, a rim at a center of the round disk is provided with plural small pores, a lower side of the lower plate base is provided with an oblique cone, the adjustment bolt is provided with an outer threaded section, the outer threaded section is locked in the inner screw hole of the lower plate base, a front end of the adjustment bolt is provided with a pointed cone, and a bottom of the adjustment bolt is provided with a tool operation part;

a rear seat, the rear seat includes a front fixing cap and a sheath cylinder, with that a center of the front fixing cap is provided with an aperture, a rim of the front fixing cap is provided with a first outer threaded section, the first outer threaded section is locked with the first inner threaded section, the sheath cylinder is disposed in the front fixing cap, an interior of the sheath cylinder is provided with a rear chamber and a front chamber, and the rear chamber is connected with the front chamber;

a ball-shaped connector, the ball-shaped connector includes a front ball head and a rear ball head which are connected at a front and rear side of a connecting part respectively, with that the ball-shaped connector is provided with a borehole, and the front ball head is sheathed with the rear seat; and a joint seat, a front side of the joint seat is sheathed with the rear ball head, and a rear side of the joint seat is connected with a faucet.

A center of the abovementioned water tray is provided with a first through-hole, and an exterior side of the first through-hole is provided with plural second drain holes.

The abovementioned retaining sleeve is provided with a discharge chamber, and an inner rim of the discharge chamber is provided with an inner retaining edge for limiting the position of the water tray while the water tray is fixed at a front side of the second chamber.

A top rim of the abovementioned inner barrel is annularly provided with plural protruding ribs, and a gap is formed between every two adjacent protruding ribs.

An inner rim of the abovementioned outer casing is provided with at least an engagement groove.

An upper rim of the abovementioned rear tank is provided with at least a locking rib.

A bottom side of the abovementioned oblique cone is provided with an indented chamber which is connected with the inner screw hole.

A second gasket is sheathed between a rear rim of the sheath cylinder and the front fixing cap.

A front rim of the abovementioned sheath cylinder is abutted at an annular block, allowing the annular block to be clipped between the sheath cylinder and the upper fixing plate.

The abovementioned joint seat is formed by a rear fixing cap, a connecting seat and plural gaskets. An interior of the rear fixing cap is provided with a second threaded section, a rim of the connecting seat is provided with a second outer threaded section and a third outer threaded section, and the second outer threaded section is locked with the second inner threaded section.

The abovementioned pointed cone is concaved with plural notches.

A rim of the second through-hole of the abovementioned upper fixing plate is further extended outward with at least a gap.

An exterior of the second through-hole of the abovementioned upper fixing plate is further provided with at least a drain hole.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 2:
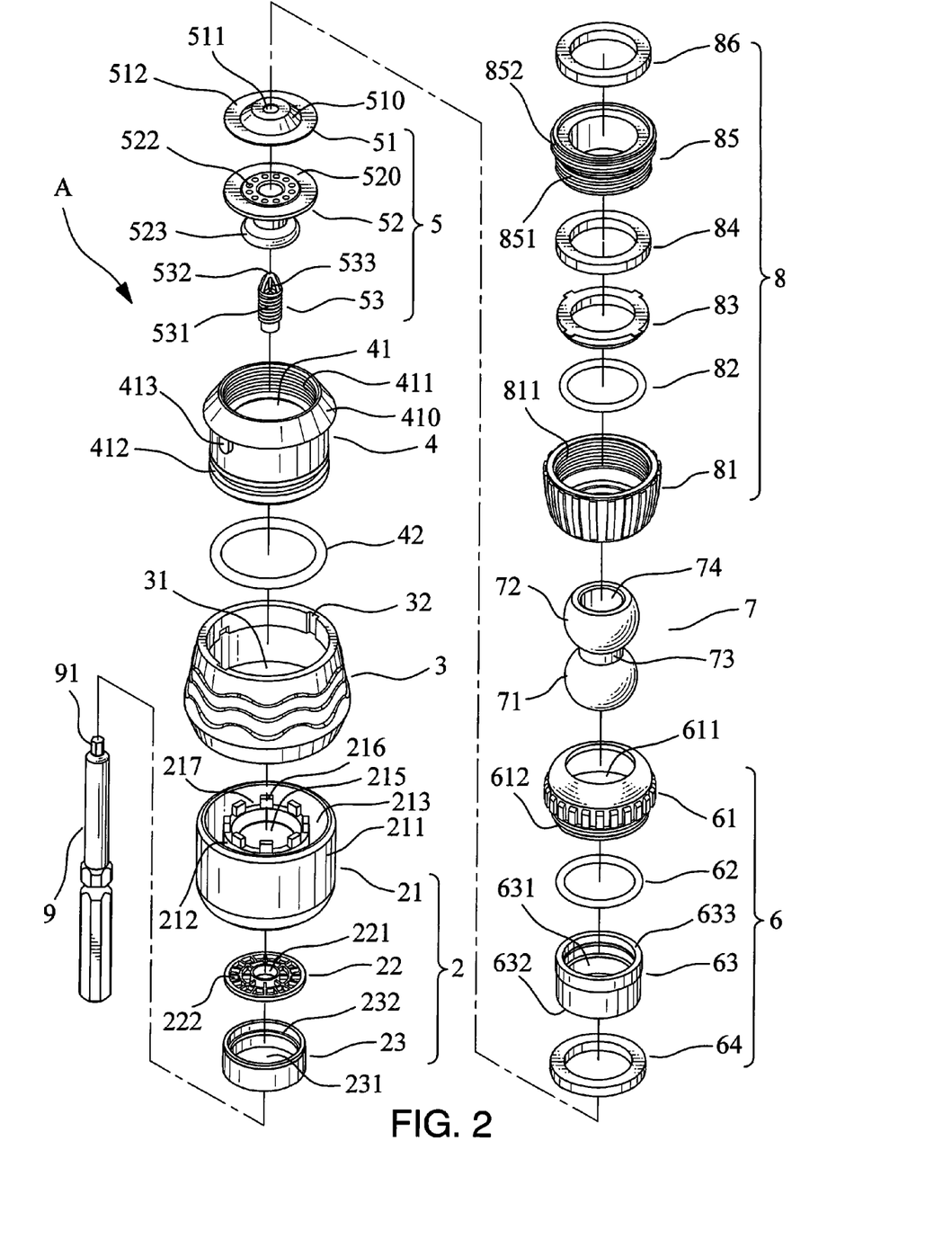
FIG. 2 shows a three-dimensionally exploded view of the present invention.
Figure 3:
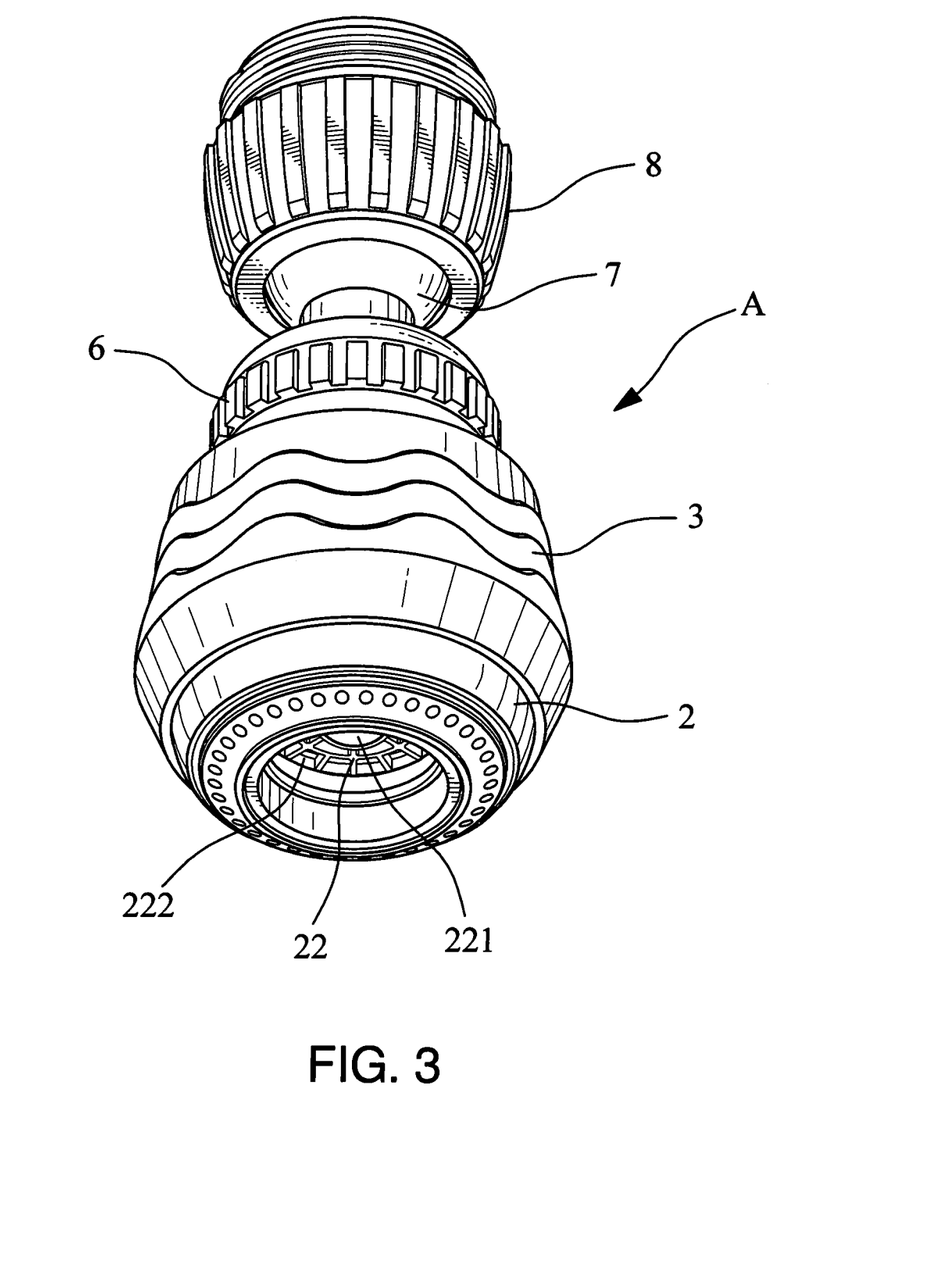
FIG. 3 shows a three-dimensional view of the present invention.
Figure 4:
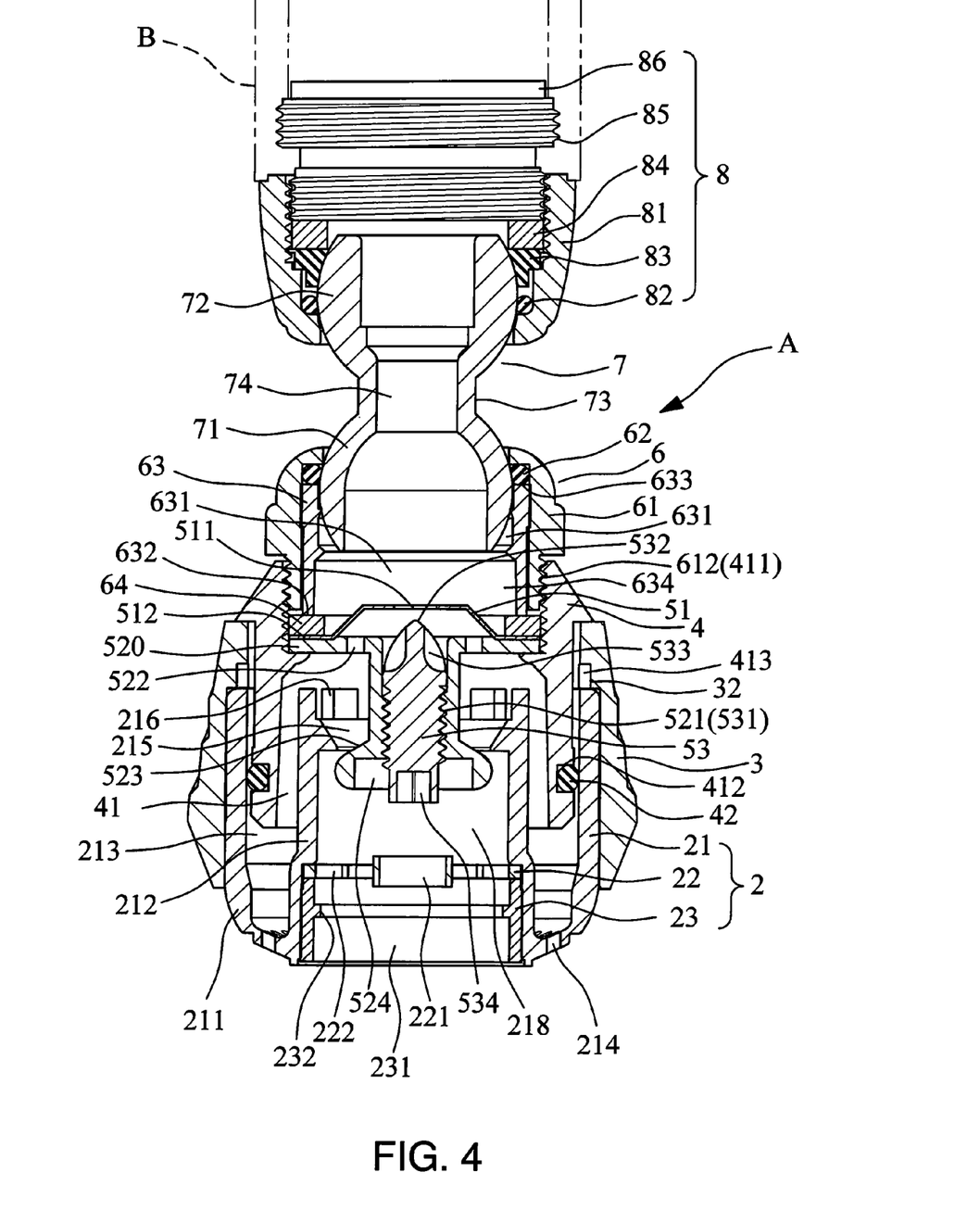
FIG. 4 shows a cutaway view of the present invention.

Referring to FIGS. 2 to 4, a bubble aerator A of the present invention comprises a water tank 2, an outer casing 3, a rear tank 4, an adjustment assembly 5, a rear seat 6, a ball-shaped connector 7 and a joint seat 8.

The water tank 2 includes a cylinder unit 21, a water tray 22 and a retaining sleeve 23. The cylinder unit 21 is formed by connecting an outer barrel 211 with an inner barrel 212, and a first chamber 213 is disposed between the outer barrel 211 and the inner barrel 212. A bottom of the first chamber 213 where the outer barrel 211 is connected with the inner barrel 212 is provided with plural first drain holes 214. A center of the inner barrel 212 is penetrated with a first round hole 215, and a top rim of the inner barrel 212 is annularly provided with plural protruding ribs 216. A gap 217 is formed between every two adjacent protruding ribs 216, and a front side of the inner barrel 212 is provided with a second chamber 218. The second chamber 218 is connected with the first round hole 215, and the water tray 22 is sheathed and fixed at a front side of the second chamber 218 by the retaining sleeve 23.

The outer casing 3 is a hollow shell, the cylinder unit 21 is sheathed in the outer casing 3, and an inner rim 31 of the outer casing 3 is provided with at least an engagement groove 32.

An upper rim of the rear tank 4 is provided with a limiting flange 410 and at least a locking rib 413. The locking rib 413 is sheathed in the engagement groove 32, and a center of the rear tank 4 is provided with a second round hole 41. The second round hole 41 is provided with a first inner threaded section 411, and a lower side of the rear tank 4 is provided with a slot 412 to latch with a first gasket 42.

Figure 5:
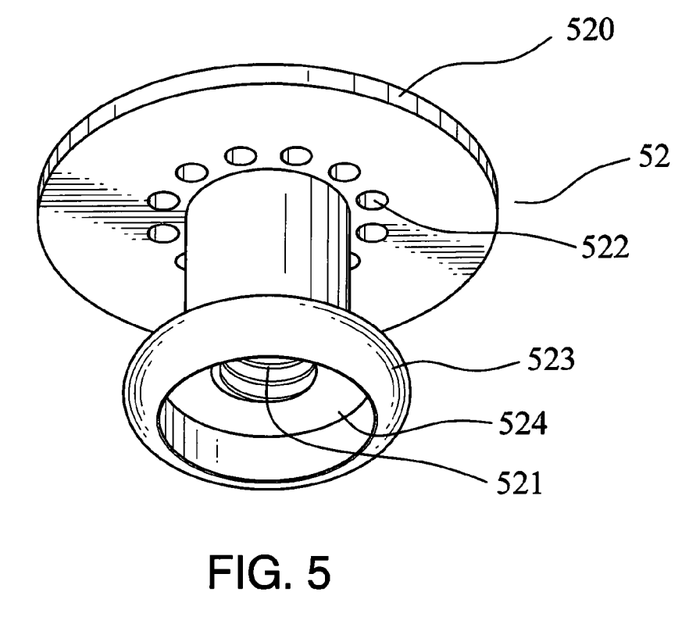
FIG. 5 shows a three-dimensional view of a lower plate base of the present invention.
Figure 6:
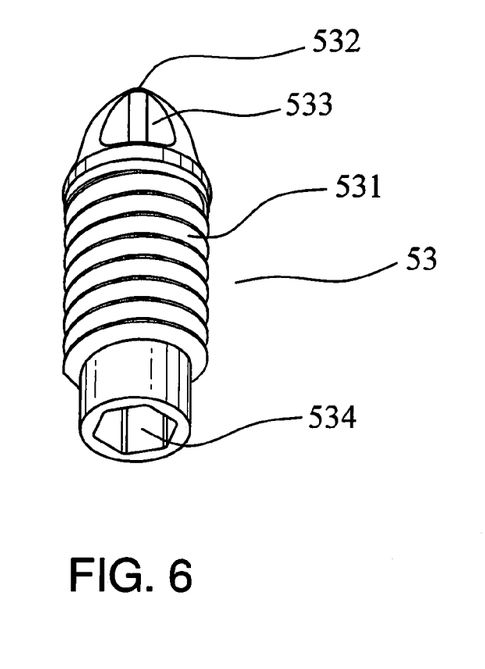
FIG. 6 shows a three-dimensional view of an adjustment bolt of the present invention.

The adjustment assembly 5 includes an upper fixing plate 51, a lower plate base 52 and an adjustment bolt 53. A central part 510 of the upper fixing plate 51 is protruded upward and is provided with a second through-hole 511. A rim of the central part 510 is extended outward with a side part 512, and a top of the lower plate base 52 is provided with a round disk 520 (as shown in FIG. 2 and FIG. 5). The round disk 520 is attached with the upper fixing plate 51, and a center of the round disk 520 is penetrated downward with an inner screw hole 521. A rim at a center of the round disk 520 is provided with plural small pores 522, and a lower side of the lower plate base 52 is provided with an oblique cone 523. A bottom side of the oblique cone 523 is provided with an indented chamber 524, and the indented chamber 524 is connected with the inner screw hole 521. The adjustment bolt 53 is provided with an outer threaded section 531 (as shown in FIG. 2 and FIG. 6), and the outer threaded section 531 is locked in the inner screw hole 521 of the lower plate base 52. A front end of the adjustment bolt 53 is provided with a pointed cone 532, and the pointed cone 532 is concaved with plural notches 533, whereas a bottom of the adjustment bolt 53 is provided with a tool operation part 534.

The rear seat 6 includes a front fixing cap 61 and a sheath cylinder 63. A center of the front fixing cap 61 is provided with an aperture 611, and a rim of the front fixing cap 61 is provided with a first outer threaded section 612. The first outer threaded section 612 is locked with the first inner threaded section 411, and the sheath cylinder 63 is disposed in the front fixing cap 61. A second gasket 62 is disposed between a rear rim 633 of the sheath cylinder 63 and the front fixing cap 61, and an interior of the sheath cylinder 63 is provided with a rear chamber 631 and a front chamber 634. The rear chamber 631 is connected with the front chamber 634, and a front rim 632 of the sheath cylinder 63 is abutted at an annular block 64, allowing the annular block 64 to be clipped between the sheath cylinder 63 and the upper fixing plate 51.

The ball-shaped connector 7 includes a front ball head 71 and a rear ball head 72 which are connected at a front and rear side of a connecting part 73, respectively. The ball-shaped connector 7 is provided with a borehole 74, the front ball head 71 is sheathed with the rear seat 6, and the rear ball head 72 is sheathed with the joint seat 8.

A front side of the joint seat 8 is sheathed with the rear ball head 72, and a rear side of the joint seat 8 is connected with a faucet B. The joint seat 8 is constituted by a rear fixing cap 81, a connecting seat 85 and plural gaskets 82, 83, 84, 86. An interior of the rear fixing cap 81 is provided with a second inner threaded section 811, and a rim of the connecting seat 85 is provided with a second outer threaded section 851 and a third outer threaded section 852, whereas the second outer threaded section 851 is locked with the second inner threaded section 811.

The abovementioned water tray 22 is a disk unit and a center thereof is provided with a first through-hole 221. An exterior side of the first through-hole 221 is provided with plural second drain holes 222.

The abovementioned retaining sleeve 23 is provided with a discharge chamber 231, and an inner rim of the discharge chamber 231 is provided with an inner retaining edge 232 for limiting the position of the water tray 22 while the water tray 22 is fixed at the front side of the second chamber 218.

Figure 7:
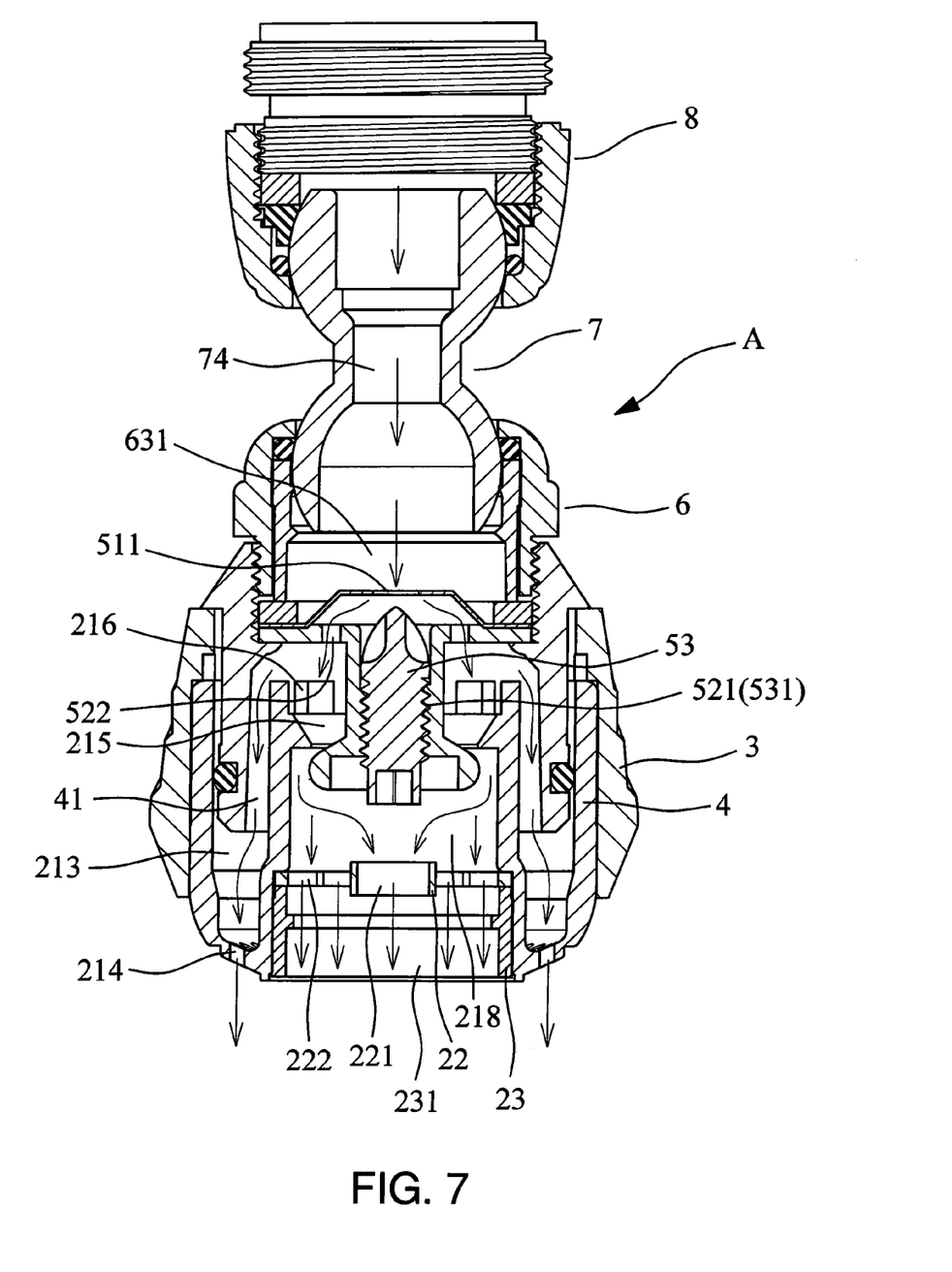
FIG. 7 shows a schematic view of water discharge of the present invention.

Referring to FIG. 7, by the abovementioned structures, upon being discharged out, water will flow from the borehole 74 of the ball-shaped connector 7, come through the rear chamber 631, the second through-hole 511 and the small pores 522, and then discharge out via two paths. One path is from the gap 217, the second round hole 41, the first chamber 213, and finally to the first drain holes 214; whereas, the other path is from the first round hole 215, the second chamber 218, and finally to the first through-hole 221 and the second drain holes 222. The present invention allows water to be discharged out uniformly and prevents from water splash effectively.

Figure 8:
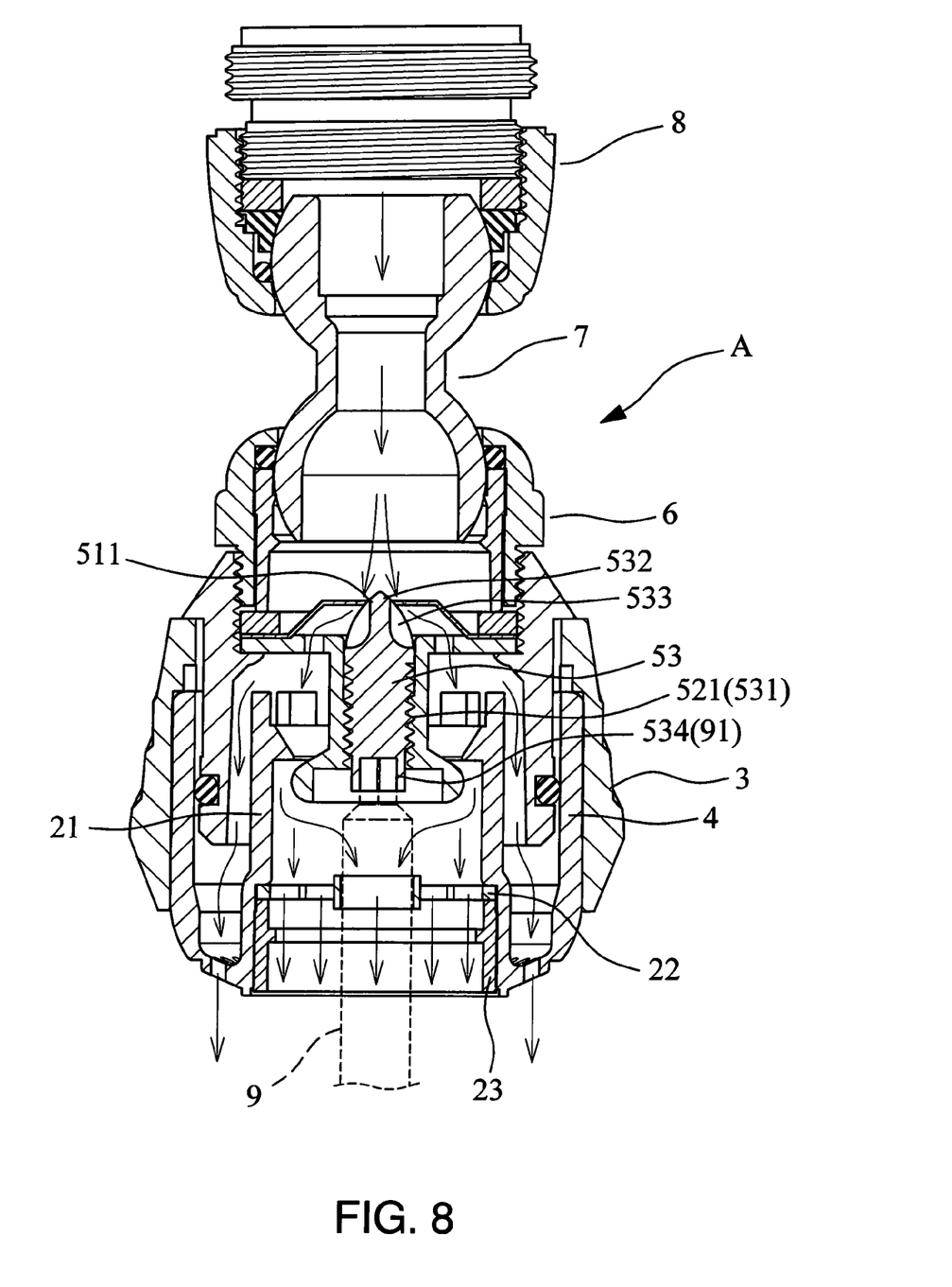
FIG. 8 shows a schematic view of an operation of adjusting the discharge capacity, according to the present invention.

Referring to FIG. 8, it shows an embodiment of the present invention in adjusting the discharge capacity. When the discharge capacity is too large or too small, an operation part 91 of a tool 9 can be inserted into the tool operation part 534 of the adjustment bolt 53 outside the bubble aerator A, and then a force is applied to rotate the adjustment bolt 53 that a position of vertical displacement of the adjustment bolt 53 can be altered by changing the screwing between the outer threaded section 531 and the inner screw hole 521. Therefore, the cross section through which water flows between the pointed cone 532 and the second through-hole 511 can be adjusted, thereby controlling the water flow and allowing a user to adjust the water flow directly, rapidly and easily outside the bubble aerator A, without dismantling the bubble aerator A. Accordingly, the present invention is capable of adjusting the discharge capacity to meet the requirement of water usage and is especially provided with the benefit of water saving.

Figure 9:
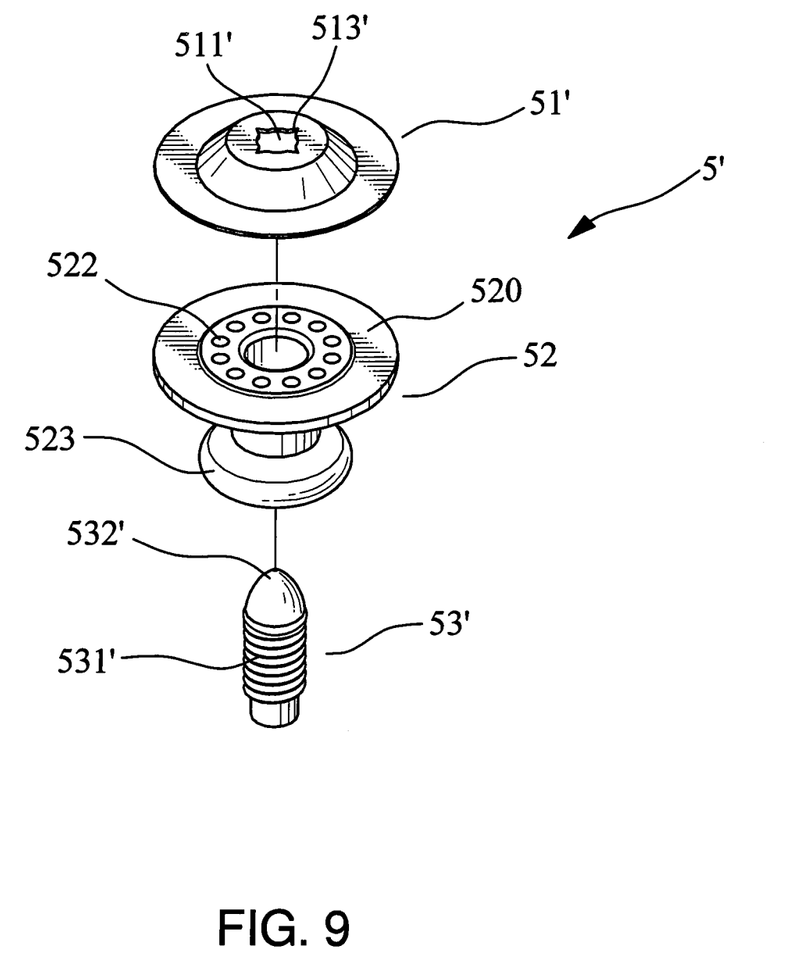
FIG. 9 shows a three-dimensionally exploded view of an adjustment assembly of a second embodiment of the present invention.
Figure 10:
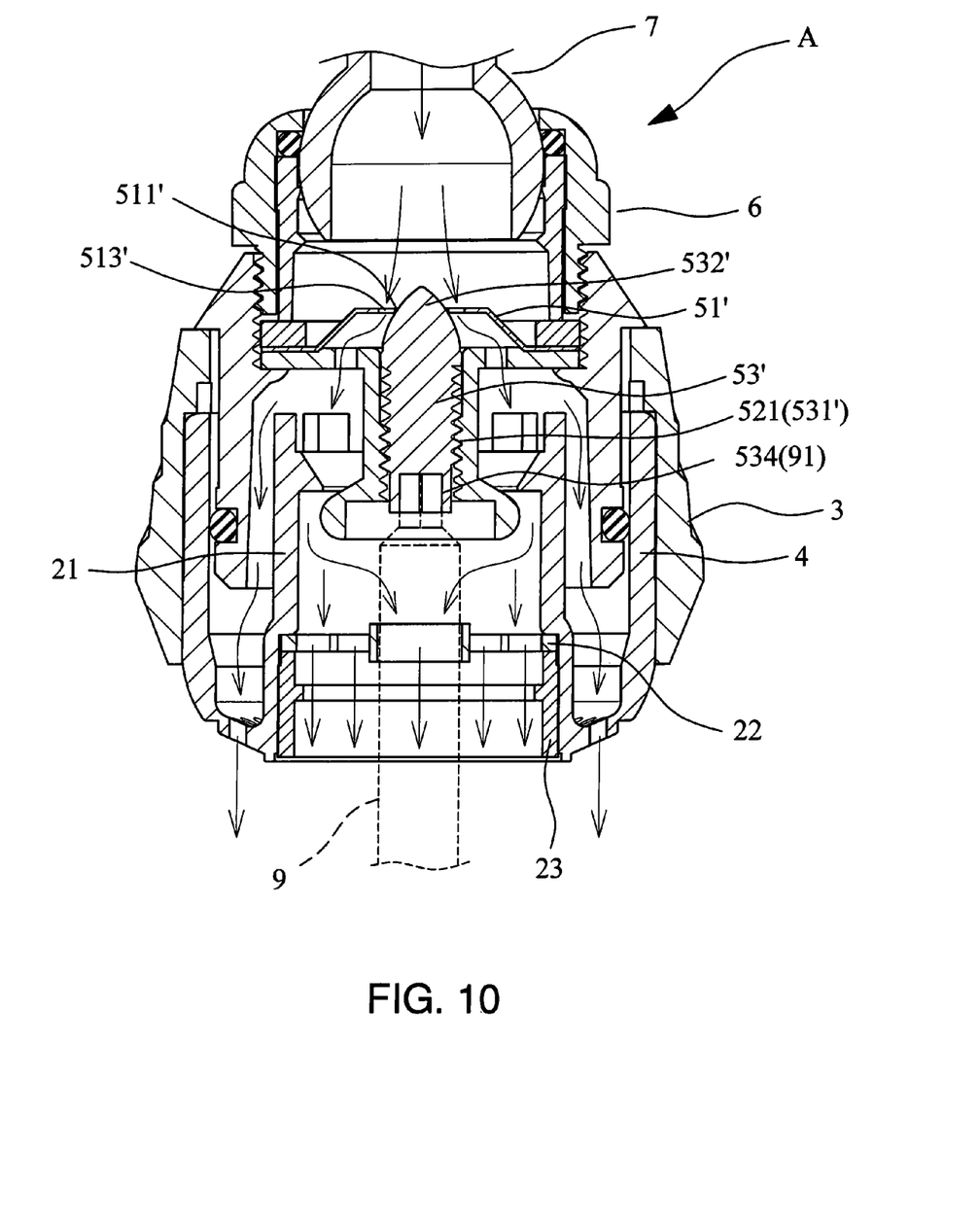
FIG. 10 shows a schematic view of an operation of adjusting the discharge capacity, according to the second embodiment of the present invention.

Referring to FIG. 9 and FIG. 10, it shows a second embodiment of the present invention. A rim of the second through-hole 511' of the upper fixing plate 51' of the adjustment assembly 5' is further extended outward with at least a gap 513', and the outer threaded section 531' of the adjustment bolt 53' is locked in the inner screw hole 521 of the lower plate base 52. Just like the embodiment shown in FIGS. 2 to 8, the screwing between the outer threaded section 531' and the inner screw hole 521 can be altered to change the position of vertical displacement of the adjustment bolt 53', which adjusts the cross section through which water flows between the pointed cone 532' and the second through-hole 511' of the adjustment bolt 53', thereby controlling the water flow. In addition, when the pointed cone 532' is tightly abutted at the second through-hole 511', water can even flow through the gap 513' to achieve the effect that the water flow can be distributed uniformly.

Figure 11:
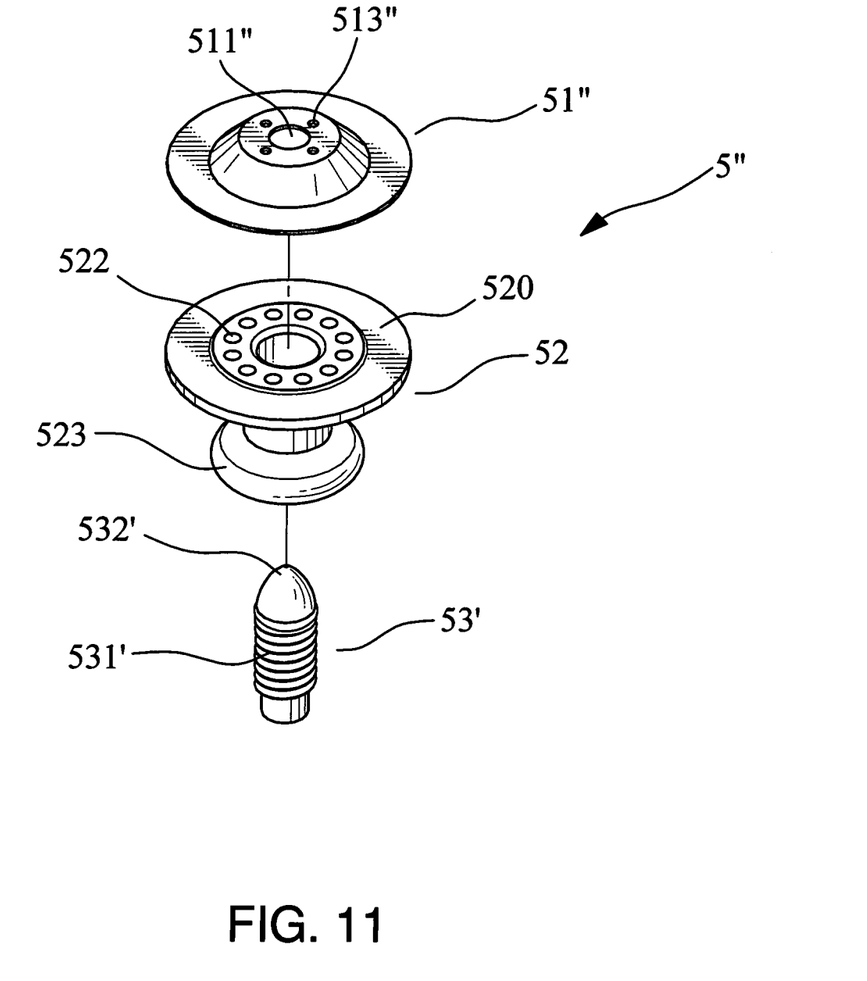
FIG. 11 shows a three-dimensionally exploded view of the adjustment assembly of a third embodiment of the present invention.
Figure 12:
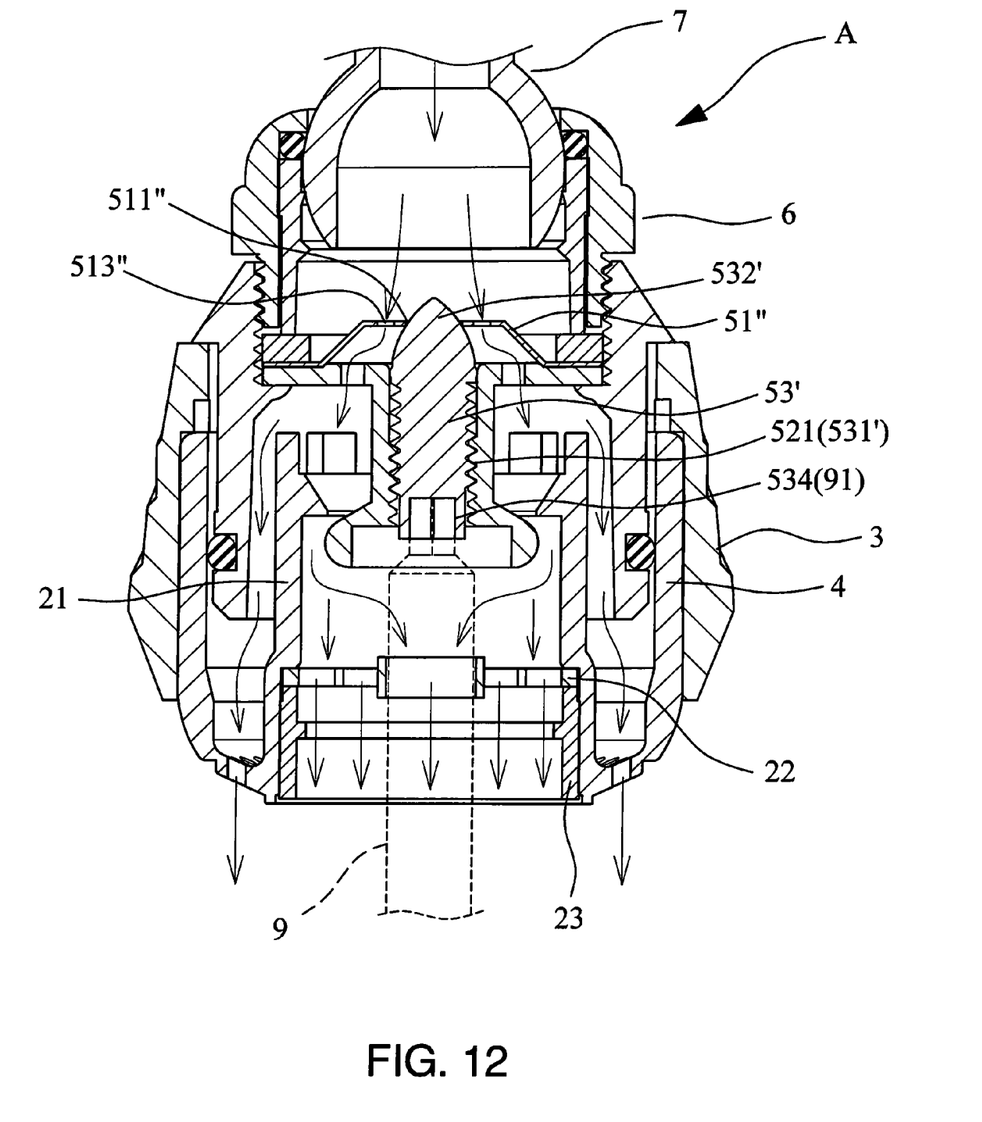
FIG. 12 shows a schematic view of an operation of adjusting the discharge capacity, according to the third embodiment of the present invention.

Referring to FIG. 11 and FIG. 12, it shows a third embodiment of the present invention. An exterior side of the second through-hole 511" of the upper fixing plate 51" of the adjustment assembly 5" is further provided with at least a drain hole 513", and the outer threaded section 531' of the adjustment bolt 53' is locked in the inner screw hole 521 of the lower plate base 52. Just like the embodiment shown in FIGS. 2 to 8, the screwing between the outer threaded section 531' and the inner screw hole 521 can be altered to change the position of vertical displacement of the adjustment bolt 53', which adjusts the cross section through which water flows between the pointed cone 532' and the second through-hole 511" of the adjustment bolt 53', thereby controlling the water flow. In addition, when the pointed cone 532' is tightly abutted at the second through-hole 511", water can even flow through the drain hole 513" to achieve the effect that the water flow can be distributed uniformly.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A flow adjustable bubble aerator comprising:
   a water tank, the water tank includes a cylinder unit, a water tray and a retaining sleeve, the cylinder unit is formed by connecting an outer barrel with an inner barrel, a first chamber is disposed between the outer barrel and the inner barrel, a bottom of the first chamber located where the outer barrel is connected with the inner barrel is provided with plural first drain holes, a center of the inner barrel is provided with a first round hole, a front side of the inner barrel is provided with a second chamber, the second chamber is connected with the first round hole, and the water tray is sheathed and fixed at a front side of the second chamber by the retaining sleeve;
   an outer casing, the outer casing is a hollow shell and the cylinder unit is sheathed in the outer casing;
   a rear tank, an upper rim of the rear tank is provided with a limiting flange, and a center of the rear tank is provided with a second round hole having a first inner threaded section;
   an adjustment assembly, the adjustment assembly includes an upper fixing plate, a lower plate base and an adjustment bolt, a center of the upper fixing plate is provided with a second through-hole, a top of the lower plate base is provided with a round disk which is attached with the upper fixing plate, a center of the round disk is provided downward with an inner screw hole, a rim at a center of the round disk is provided with plural small pores, a lower side of the lower plate base is provided with an oblique cone extending downwardly, the adjustment bolt is provided with an outer threaded section threadedly connected with the inner screw hole of the lower plate base, a front end of the adjustment bolt is provided with a pointed cone, the pointed cone of the adjustment bolt is moveably adjusted toward and away from the second through-hole of the upper fixing plate via the threaded connection between the adjustment bolt and the lower plate base, a bottom of the adjustment bolt is provided with a tool operation part;
   a rear seat, the rear seat includes a front fixing cap and a sheath cylinder, with that a center of the front fixing cap is provided with an aperture, a rim of the front fixing cap is provided with a first outer threaded section which is locked with the first inner threaded section, the sheath cylinder is disposed in the front fixing cap, an interior of the sheath cylinder is provided with a rear chamber and a front chamber, and the rear chamber is connected with the front chamber;
   a ball-shaped connector, the ball-shaped connector includes a front ball head, a rear ball head, and a connecting part, the front ball head is connected to a front end of the connecting part and the rear ball head is connected to a rear end of the connecting part, the ball-shaped connector is provided with a borehole, and the front ball head is sheathed with the rear seat; and a joint seat, a front side of the joint seat is sheathed with the rear ball head, and a rear side of the joint seat is connected with a faucet;

wherein the front ball head of the ball-shaped connector is rotatably and pivotally connected to the rear seat and the rear ball head of the ball-shaped connector is rotatably and pivotally connected to the joint seat.

2. The flow adjustable bubble aerator according to claim 1, wherein a center of the water tray is provided with a first through-hole, and an exterior side of the first through-hole is provided with plural second drain holes.

3. The flow adjustable bubble aerator according to claim 1, wherein the retaining sleeve is provided with a discharge chamber, and an inner rim of the discharge chamber is provided with an inner retaining edge for limiting the position of the water tray when the water tray is fixed at a front side of the second chamber.

4. The flow adjustable bubble aerator according to claim 1, wherein a top rim of the inner barrel is annularly provided with plural protruding ribs, and a gap is formed between every two adjacent protruding ribs.

5. The flow adjustable bubble aerator according to claim 1, wherein an inner rim of the outer casing is provided with an engagement groove.

6. The flow adjustable bubble aerator according to claim 1, wherein an upper rim of the rear tank is provided with a locking rib.

7. The flow adjustable bubble aerator according to claim 1, wherein a bottom side of the oblique cone is provided with an indented chamber which is connected with the inner screw hole.

8. The flow adjustable bubble aerator according to claim 1, wherein a second gasket is sheathed between the rear rim of the sheath cylinder and the front fixing cap.

9. The flow adjustable bubble aerator according to claim 1, wherein the front rim of the sheath cylinder is abutted at an annular block, allowing the annular block to be clipped between the sheath cylinder and the upper fixing plate.

10. The flow adjustable bubble aerator according to claim 1, wherein the joint seat is formed by a rear fixing cap, a connecting seat and plural gaskets, an interior of the rear fixing cap is provided with a second inner threaded section, a rim of the connecting seat is provided with a second outer threaded section and a third outer threaded section, and the second outer threaded section is locked with the second inner threaded section.

11. The flow adjustable bubble aerator according to claim 1, wherein the pointed cone located on the front end of the adjustment bolt is concaved and has a plurality of notches.

12. The flow adjustable bubble aerator according to claim 1, wherein a rim of the second through-hole of the upper fixing plate is further extended outward with a gap.

13. The flow adjustable bubble aerator according to claim 1, wherein an exterior side of the second through-hole of the upper fixing plate is further provided with a drain hole.

* * * * *